US012515925B2

(12) United States Patent
Strømstad et al.

(10) Patent No.: US 12,515,925 B2
(45) Date of Patent: Jan. 6, 2026

(54) MOTION-STABILIZED CRANE SYSTEMS AND ASSOCIATED METHODS

(71) Applicant: Grant Prideco, Inc., Houston, TX (US)

(72) Inventors: Jan Einar Strømstad, Kristiansand (NO); Anders Meisfjordskar, Grimstad (NO)

(73) Assignee: Grant Prideco, Inc., Houston, TX (US)

( * ) Notice: Subject to any disclaimer, the term of this patent is extended or adjusted under 35 U.S.C. 154(b) by 128 days.

(21) Appl. No.: 18/690,997

(22) PCT Filed: Sep. 12, 2022

(86) PCT No.: PCT/US2022/043231

§ 371 (c)(1),
(2) Date: Mar. 11, 2024

(87) PCT Pub. No.: WO2023/039253

PCT Pub. Date: Mar. 16, 2023

(65) Prior Publication Data

US 2024/0391740 A1 Nov. 28, 2024

Related U.S. Application Data

(60) Provisional application No. 63/243,169, filed on Sep. 12, 2021.

(51) Int. Cl.

*B66C 23/53* (2006.01)
*B66C 13/06* (2006.01)
*B66C 13/46* (2006.01)

(52) U.S. Cl.

CPC ............ *B66C 23/53* (2013.01); *B66C 13/063* (2013.01); *B66C 13/46* (2013.01)

(58) Field of Classification Search

CPC ......... B66C 23/53; B66C 23/52; B66C 23/62; B66C 13/063; B66C 13/06; B66C 13/46

See application file for complete search history.

(56) References Cited

U.S. PATENT DOCUMENTS 5,437,531 A 8/1995 Kress
9,108,825 B2 * 8/2015 Kjolseth ................ B66C 23/52

(Continued)

FOREIGN PATENT DOCUMENTS

JP H08-143272 A 6/1996
JP 2017024872 A 2/2017

(Continued)

OTHER PUBLICATIONS

JP 2017/024872A Machine Translation. (Year: 2017).*

(Continued)

*Primary Examiner* — Anna M Momper
*Assistant Examiner* — Juan J Campos, Jr.
(74) *Attorney, Agent, or Firm* — Conley Rose, P.C.

(57) ABSTRACT

A motion-stabilized crane system includes a crane base extending from a first end to a second end opposite the first end, a crane boom having a first end pivotably coupled to the second end of the crane base and a second end opposite the first end, a hoisting cable, a hook, a motion stabilizer including a hook housing in which at least one of the hoisting cable and the hook is received, a linear actuator configured to rotate the hook housing about a first, a sensor configured to capture as a sensor output associated with the position of at least one of the hook and the hoisting cable in the hook housing, and a stabilizer control module configured to activate the linear actuator to reduce an angle formed between at least one of the hook and the hoisting cable and a vertical axis based on the senor output.

20 Claims, 7 Drawing Sheets

(56) References Cited

U.S. PATENT DOCUMENTS

| | | | | |
|---|---|---|---|---|
| 9,630,812 | B1 * | 4/2017 | Galway | B66C 23/02 |
| 9,969,599 | B2 * | 5/2018 | Lossec | B63C 3/06 |
| 2010/0089855 | A1 * | 4/2010 | Kjolseth | B66C 13/02 212/276 |
| 2014/0377004 | A1 * | 12/2014 | Lossec | B66C 23/52 405/3 |
| 2015/0129529 | A1 * | 5/2015 | Screaton | B66C 13/063 212/277 |
| 2019/0112167 | A1 | 4/2019 | Fukumori et al. | |
| 2020/0239284 | A1 | 7/2020 | Bakalyar | |

FOREIGN PATENT DOCUMENTS

| | | | |
|---|---|---|---|
| NO | 20151817 | A | 6/2017 |
| WO | 2015199543 | A | 12/2015 |

OTHER PUBLICATIONS

JPH 08143272A Machine Translation. (Year: 1996).*
International Search Report and Written Opinion dated Jan. 5, 2023, for Application No. PCT/US2022/043231.

* cited by examiner

MOTION-STABILIZED CRANE SYSTEMS AND ASSOCIATED METHODS

CROSS-REFERENCE TO RELATED APPLICATIONS

The present application is a 35 U.S.C. § 371 national stage application of PCT/US2022/043231 filed Sep. 12. 2022, entitled "Motion-Stabilized Crane Systems and Associated Methods" which claims benefit of U.S. provisional patent application Ser. No. 63/243,169 filed Sep. 12, 2021, and entitled "Anti-Sway Crane Systems and Methods," both of which are hereby incorporated herein by reference in their entirety for all purposes.

STATEMENT REGARDING FEDERALLY SPONSORED RESEARCH OR DEVELOPMENT

Not applicable.

BACKGROUND

Crane systems or various types are employed on offshore vessels for lifting and transporting loads. As but one example, cranes are often employed on offshore drilling vessels as part of an offshore operation for forming and completing a subterranean wellbore which extends from a seabed beneath the drilling vessel. The drilling vessel may include a crane system for lifting various equipment from an offboard location such as a separate vessel or dock and lowering the transported equipment onto a deck of the drilling vessel. For example, the crane system may transport tubulars such as drill pipes or other equipment from the offboard location to the deck of the drilling vessel such that the equipment may be utilized as part of the offshore drilling operation. It may be understood that the vessel on which the crane system is positioned may be subject to various types of forces and movements in response to the wave action of the body of water in which the vessel is located. For example, the vessel may undesirably heave and/or roll in response to the wave action of the body of water.

SUMMARY

An embodiment of a motion-stabilized crane system for lifting a load comprises a crane base extending from a first end to a second end opposite the first end, a crane boom having a first end pivotably coupled to the second end of the crane base and a second end opposite the first end, a hoisting cable supported by the crane boom, a hook suspended from the hoisting cable of the crane system, a motion stabilizer pivotably coupled to the second end of the crane boom, the motion stabilizer comprising a hook housing in which at least one of the hoisting cable and the hook is received, a linear actuator coupled to the hook housing and configured to rotate the hook housing about a first axis in response to the activation of the linear actuator, a sensor coupled to the hook housing and configured to capture as a sensor output associated with the position of at least one of the hook and the hoisting cable in the hook housing, and a stabilizer control module configured to activate the linear actuator to reduce an angle formed between at least one of the hook and the hoisting cable and a vertical axis based on the senor output produced by the sensor. In some embodiments, the linear actuator comprises a first linear actuator and the motion stabilizer further comprises a second linear actuator coupled to the hook housing and configured to rotate the hook housing about a second axis, extending orthogonal to the first axis, in response to the activation of the second linear actuator, and the stabilizer control module is configured to activate the first linear actuator and the second linear actuator to reduce the angle formed between at least one of the hook and the hoisting cable and a vertical axis based on the senor output produced by the sensor. In some embodiments, the first axis is a first horizontal axis and the second axis is a second horizontal axis each oriented orthogonal the vertical axis. In certain embodiments, the motion stabilizer further comprises a stabilizer inertial measurement unit (IMU) coupled to the hook housing, and wherein the stabilizer control module is configured to determine the angle formed between the at least one of the hook and the hoisting cable and the vertical axis based on an output produced by the stabilizer IMU. In certain embodiments, the sensor comprises a first optical sensor and the motion stabilizer further comprises a second optical sensor coupled to the hook housing and oriented ninety degrees from the first optical sensor. In some embodiments, both the first optical sensor comprises a first depth camera and the second optical sensor comprises a second depth camera. In some embodiments, the hook housing comprises an internal dock that couples to the hook when the hook is in a docked position to restrict relative rotation between the hook and the hook housing. IN certain embodiments, the motion stabilizer further comprises a telescoping actuator coupled to the hook housing and configured to displace the hook housing along the vertical axis in response to the activation of the telescoping actuator, and the stabilizer control module is configured to activate the telescoping actuator to maintain a tension on a terminal end of the hoisting cable. In some embodiments, the hook housing of the motion stabilizer comprises a plurality of circumferentially spaces sheaves which engage the hoisting cable to align a segment of the hoisting cable positioned between the plurality of sheaves with the vertical axis.

An embodiment of a motion-stabilized crane system for lifting a load comprises a crane base extending from a first end to a second end opposite the first end, a crane boom having a first end pivotably coupled to the second end of the crane base and a second end opposite the first end, a hoisting cable supported by the crane boom, a hook suspended from the hoisting cable of the crane system, a motion stabilizer pivotably coupled to the second end of the crane boom, the motion stabilizer comprising a hook housing in which at least one of the hoisting cable and the hook is received, a linear actuator coupled to the hook housing and configured to rotate the hook housing about a first axis in response to the activation of the linear actuator, an optical sensor coupled to the hook housing and configured to capture as a sensor output associated with the position of at least one of the hook and the hoisting cable in the hook housing, and a stabilizer control module configured to activate the linear actuator to counteract an uncontrolled motion of at least one of the hook and the hoisting cable based on the senor output produced by the optical sensor. In some embodiments, the uncontrolled motion of the at least one of the hook and the hoisting cable forms an angle between the at least one of the hook and the hoisting cable and a vertical axis, and wherein the stabilizer control module is configured to activate the linear actuator to reduce the angle formed between the at least one of the hook and the hoisting cable and the vertical axis based on the senor output produced by the optical sensor. In some embodiments, the linear actuator comprises a first linear actuator and the motion stabilizer further comprises a second linear actuator coupled to the hook housing and configured to rotate the hook housing about a second axis, extending orthogonal to the first axis, in response to the activation of the second linear actuator, and the stabilizer control module is configured to activate the first linear actuator and the second linear actuator to counteract the uncontrolled motion of the at least one of the hook and the hoisting cable based on the senor output produced by the optical sensor. In certain embodiments, optical sensor comprises a first optical sensor and the motion stabilizer further comprises a second optical sensor coupled to the hook housing and oriented ninety degrees from the first optical sensor. In some embodiments, both the first optical sensor comprises a first depth camera and the second optical sensor comprises a second depth camera. In some embodiments, the hook housing comprises an internal dock that couples to the hook when the hook is in a docked position to restrict relative rotation between the hook and the hook housing. In certain embodiments, the motion stabilizer further comprises a telescoping actuator coupled to the hook housing and configured to displace the hook housing along a vertical axis in response to the activation of the telescoping actuator, and the stabilizer control module is configured to activate the telescoping actuator to maintain a tension on a terminal end of the hoisting cable.

An embodiment of a motion stabilizer for a crane system comprises a hook housing configured to receive at least one of a hoisting cable and a hook of the crane system, a linear actuator coupled to the hook housing and configured to rotate the hook housing about a first axis in response to the activation of the linear actuator, a sensor coupled to the hook housing and configured to capture as a sensor output associated with the position of at least one of a hook and a hoisting cable of the crane system in the hook housing when the motion stabilizer is coupled to a crane boom of the crane system, and a stabilizer control module configured to activate the linear actuator to reduce an angle formed between at least one of the hook and the hoisting cable and a vertical axis based on the senor output produced by the sensor. In some embodiments, the linear actuator comprises a first linear actuator and the motion stabilizer further comprises a second linear actuator coupled to the hook housing and configured to rotate the hook housing about a second axis, extending orthogonal to the first axis, in response to the activation of the second linear actuator, and the stabilizer control module is configured to activate the first linear actuator and the second linear actuator to reduce the angle formed between at least one of the hook and the hoisting cable and a vertical axis based on the senor output produced by the sensor. In some embodiments, the sensor comprises a first optical sensor and the motion stabilizer further comprises a second optical sensor coupled to the hook housing and oriented ninety degrees from the first optical sensor. In certain embodiments, both the first optical sensor comprises a first depth camera and the second optical sensor comprises a second depth camera.

BRIEF DESCRIPTION OF THE DRAWINGS

For a detailed description of exemplary embodiments of the disclosure, reference will now be made to the accompanying drawings in which.

DETAILED DESCRIPTION

Figure 1:
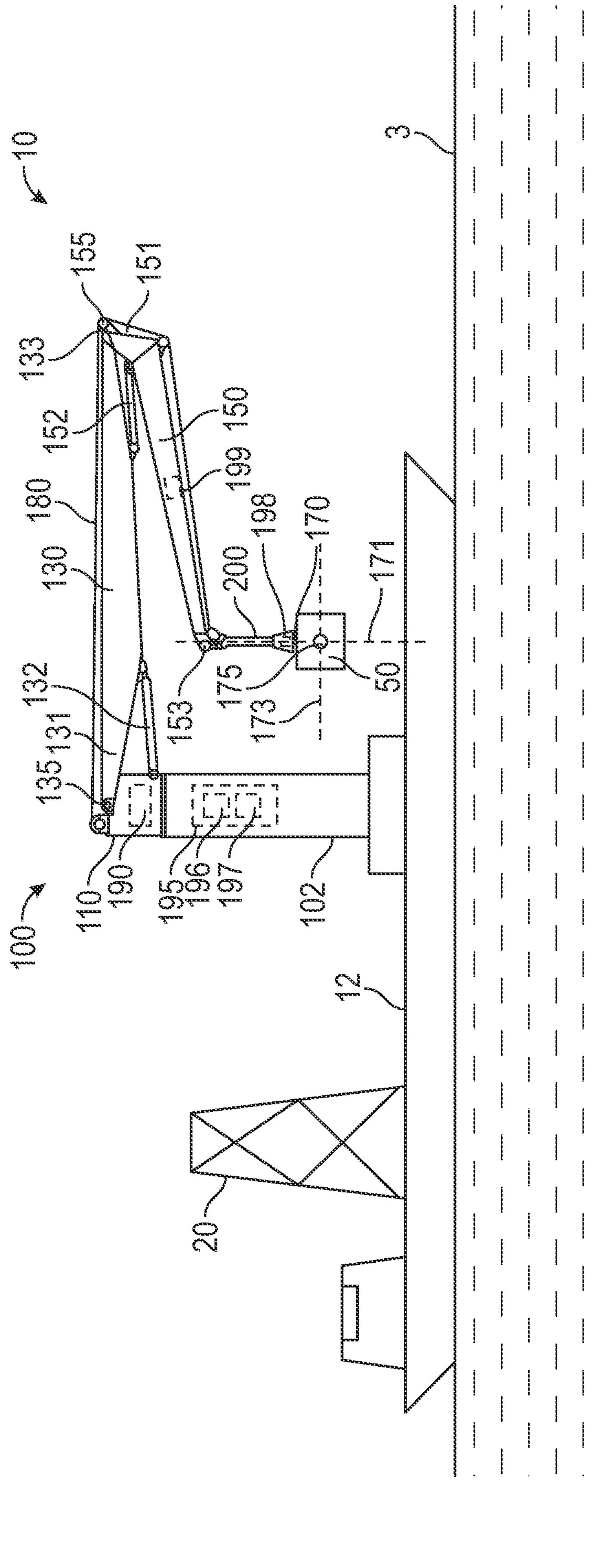
FIG. 1 is a schematic view of an offshore vessel including a crane system according to some embodiments.
Figure 2:
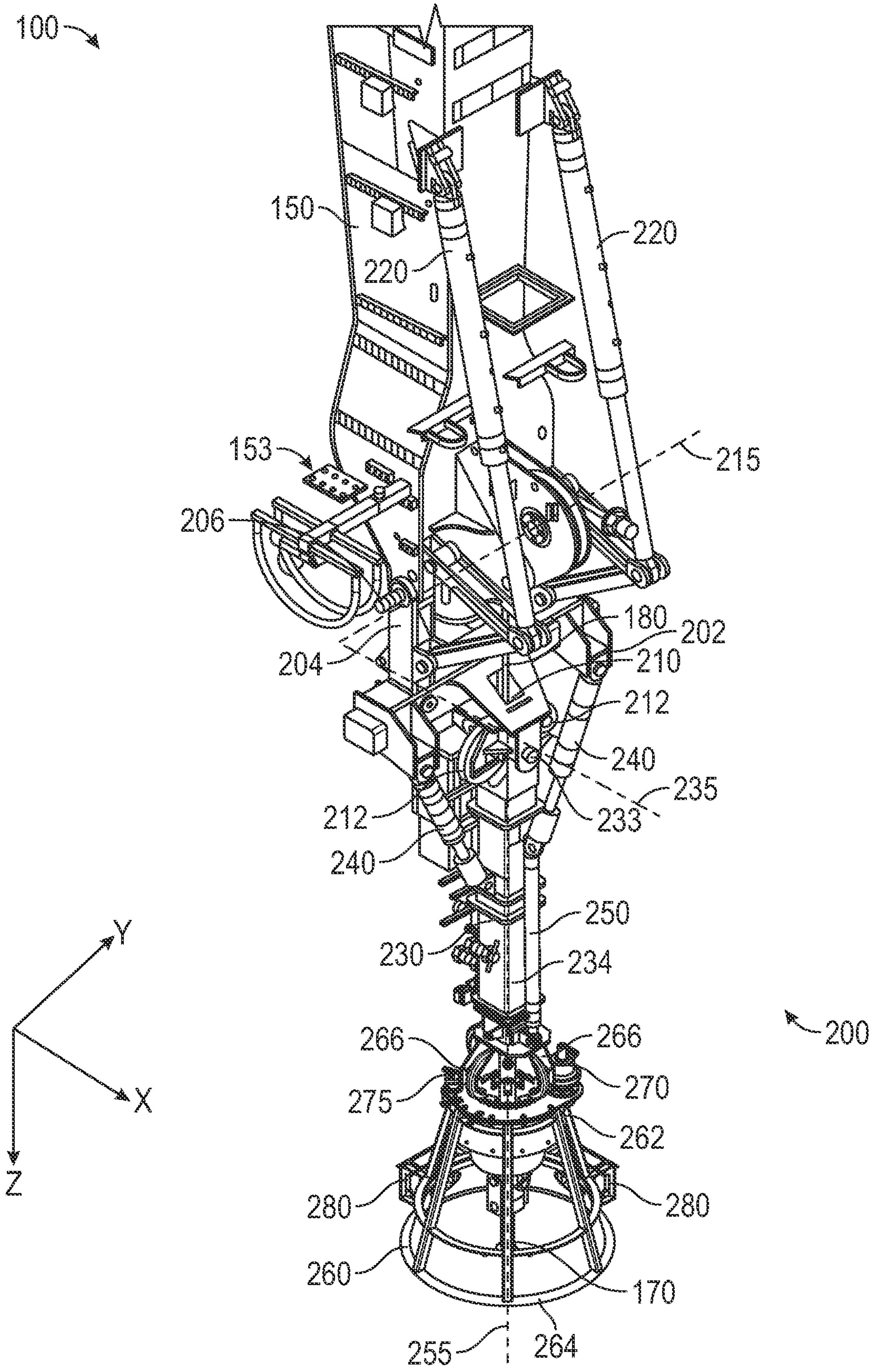
FIG. 2 is a perspective view of a motion stabilizer of the crane system of FIG. 1 according to some embodiments.
Figure 3:
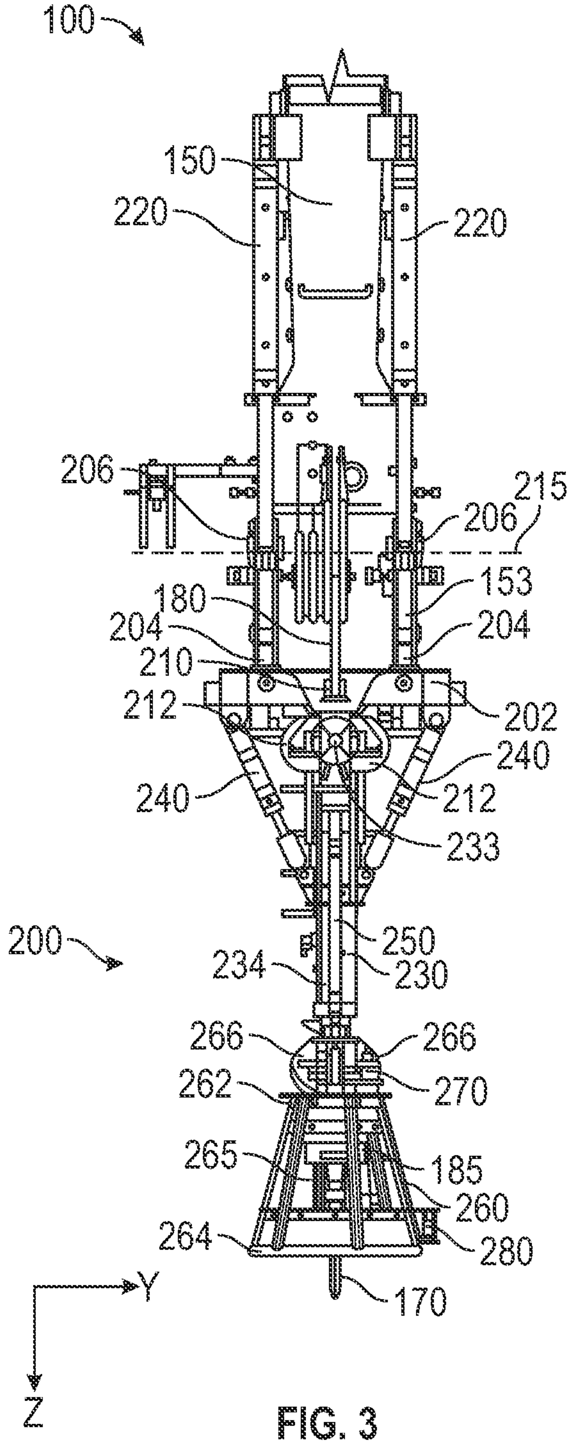
FIG. 3 is a front view of the motion stabilizer of FIG. 2.
Figure 4:
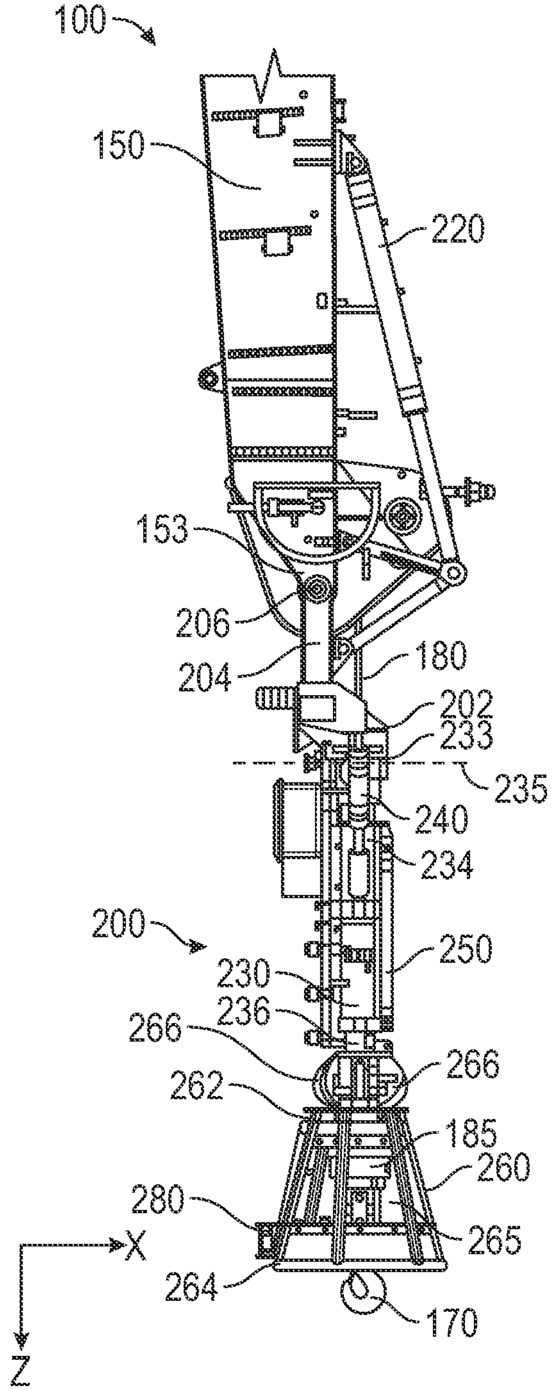
FIG. 4 is a side view of the motion stabilizer of FIG. 2.

The following discussion is directed to various exemplary embodiments.

However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

As described above, crane systems are often employed on offshore vessels for transporting equipment between an offboard location external the vessel and a deck of the vessel. Being located offshore, the vessel is typically subject to rolling, heaving, and other undesirable and uncontrolled movements in response to the wave action of the body of water in which the vessel is located. These undesirable movements of the vessel may occur as a crane system of the vessel is operated to transport a load, potentially resulting in the movement of the vessel being transferred to the load. For example, the load may sway back-and-forth in an uncontrolled pendulum motion as a result of the uncontrolled movement of the vessel. The uncontrolled motion of the load may present a danger to the vessel's personnel as well as to other equipment or structures located on the deck of the vessel against which the load may collide as it swings uncontrollably from the crane.

Conventionally, a tug line may be attached to the load suspended from a crane of an offshore vessel so as to stabilize the load and minimize any uncontrolled motion of the load as it is transported through the air by the crane. As an example, a first end of the tug line may be attached to the load while an opposing second end of the tug line may be manually handled by crew located on the deck of the vessel. In this arrangement the crew may apply tension to or "tug" on the load as it is transported by the crane to stabilize the motion of the load and minimize any undesirable swaying of the load in the air. However, this conventional approach places the crew within the vicinity of the load suspended from the crane, potentially exposing the crew to the hazard of the suspended load which may still move unpredictably even when stabilized by the tug line. Moreover, the additional manpower required for manually stabilizing the suspended load as it is transported by the crane may undesirably increase the costs associated with operating the vessel's crane.

Accordingly, embodiments of motion-stabilized crane systems and associated methods are disclosed herein. Embodiments of motion-stabilized crane systems include a motion stabilizer pivotably coupled to a boom of the crane system, the motion stabilizer including a hook housing for receiving at least one of a hook and a hoisting cable of the crane system, and one or more linear actuators pivotably coupled to the hook housing. Additionally, the motion stabilizer may include a sensor coupled to the hook housing and a stabilizer control module configured to activate the one or more linear actuators of the motion stabilizer to reduce an angle formed between at least one of the hook and the hoisting cable and a vertical axis based on a sensor output provided by the sensor. In some embodiments, the sensor of the motion stabilizer may comprise an optical sensor such as a camera or a laser sensor such as a scanning laser sensor (e.g. a Lidar sensor) configured to monitor a position of at least one of the hook and the hoisting cable in in an interior of the hook housing. In this manner, the motion stabilizer may counteract an uncontrolled motion of at least one of the hook and the hoisting cable based on the senor output produced by the optical sensor. By counteracting uncontrolled motion of at least one of the hook and hoisting cable, a load suspended from the hook may concomitantly be stabilized as it is lifted by the crane system, enhancing the safety of the crane system while also rendering superfluous tug lines used in conventional crane systems to stabilize the load suspended therefrom.

Referring now to FIG. 1, an embodiment of an offshore vessel 10 including a motion-stabilized crane system 100 is shown. In this exemplary embodiment, offshore vessel 10 comprises a drilling vessel or ship and thus may also be referred to herein as drilling vessel 10. However, it may be understood that in other embodiments offshore vessel 10 may not be a drilling vessel and instead may be another type of offshore vessel such as a supply vessel, a cargo vessel, etc. It may also be understood that in other embodiments the motion-stabilized crane system 100 of drilling vessel 10 may be incorporated in other applications, including land-based applications in which crane system 100 is not located offshore.

In this exemplary embodiment, drilling vessel 10 located at a waterline 3 generally includes a deck 12, a derrick or mast 20, and a crane system 100. It may of course be understood that drilling vessel 10 may include equipment other than mast 20 and crane system 100 shown in FIG. 1. Mast 20 extends vertically upwards from the deck 12 of drilling vessel 10 and may be utilized in the performance of an offshore drilling operation using the drilling vessel 10. For example, mast 20 may be used to lower equipment such as drill pipes, downhole tools, etc., through a subsea marine riser (not shown in FIG. 1) which extends from the drilling vessel 10 to a seabed located beneath the drilling vessel 10 and waterline 3. For example, the marine riser may connect to a wellhead located on the seabed, the wellhead forming an entrance to a subterranean wellbore that extends into and through the seabed. Mast 20 may incorporate additional equipment not shown in FIG. 1 including a winch system, a top drive, a surface pump, etc., for delivering fluids and/or equipment to the wellbore.

Crane system 100 of drilling vessel 10 is utilized for transporting equipment between an offboard location (e.g., a deck of another vessel, a dock) and the deck 12 of vessel 10. For example, crane system 100 may transport equipment from the offboard location to the deck 12 of drilling vessel 10 from which the equipment may be delivered to the wellbore using mast 20 of vessel 10. In this exemplary embodiment, crane system 100 is a knuckle boom crane generally including a crane base or pedestal 102, a crane king 110, a boom 130, a jib 150, a hook 170 suspended from a hoisting cable 180 of the crane system 100, and a motion stabilizer 200 as will be described further herein. It may be understood that in other embodiments the configuration of crane system 100 may vary. For example, in other embodiments crane system 100 may comprise a straight-boom crane that does not include an articulating jib like the jib 150 of crane system 100.

The pedestal 102 of crane system 100 is positioned on the deck 12 of drilling vessel 10 from which the pedestal 102 extends vertically upwards. The crane king 110 of crane system 100 is coupled to a vertically upper end of the pedestal 102 by a rotary coupling 104 sometimes referred to as a slew bearing. Rotary coupling 104 permits the crane king 110 to rotate about a vertically extending axis relative to the pedestal 102 and deck 12 of drilling vessel 10 upon which the pedestal 12 is positioned. The crane king 110 may house a winch 190 of the crane system 100 from which the hoisting cable 180 is extended and retracted; however, in other embodiments, the winch 190 may be located external the crane king 110.

The boom 130 of crane system 100 is pivotably coupled to the crane king 110 such that the boom 130 is pivotable relative to the crane king 110. Additionally, one or more boom actuators 132 are coupled between the boom 130 and crane king 110. Boom actuators 132 comprise linear actuators in this exemplary embodiment such as hydraulically or electrically powered linear actuators; however, the configuration of boom actuators 132 may vary in other embodiments. In this configuration, a first or proximal end 131 of the boom 130 is pivotably coupled to the crane king 110 whereby extension and retraction of boom actuators 132 results in the boom 130 rotating about a horizontally extending boom axis 135 (extending out of the page in FIG. 1) relative to the crane king 110.

The jib 145 of crane system 100 is pivotably coupled to a second or distal end 133 of the boom 130 such that jib 145 may rotate relative to the boom 130. Additionally, one or more jib actuators 152 are coupled between the boom 130 and jib 150. As with boom actuators 132 described above, jib actuators 152 comprise linear actuators in this exemplary embodiment such as hydraulically or electrically powered linear actuators; however, the configuration of jib actuators 152 may vary in other embodiments. In this arrangement, a first or proximal end 151 of the jib 150 is pivotably coupled to the distal end 133 of boom 130 whereby extension and retraction of jib actuators 152 results in the rotation of jib 150 about a horizontally extending jib axis 155 (extending out of the page in FIG. 1) relative to the boom 130. With jib 150 pivotably connected to the boom 130, which pivotably connects to the crane king 110, a second or distal end 153 of the jib 150 may be rotated about a vertical axis in response to the actuation of rotary coupling 104, rotated about boom axis 135 in response to the actuation of boom actuators 132, and rotated about jib axis 155 in response to the actuation of jib actuators 152.

The hoisting cable 180 of crane system 100 extends from winch 190, along a plurality of sheaves, and to the hook 170 which is suspended from the distal end 153 of the jib 150 of crane system 100. Additionally, and as will be discussed further herein, the hoisting cable 180 extends through the motion stabilizer 200 of crane system 100. In the position shown in FIG. 1, the hook 170 coupled to hoisting cable 180 may be raised and lowered along a vertical axis 171 in response to the actuation of winch 190 to retract or extend hoisting cable 180 therefrom. A load 50 may be releasably coupled to the hook 170 of crane system 100 such that the load 50 may be carried through the air vertically above the deck 12 as the load 50 is suspended from the hook 170. Once the load 50 is positioned at a desired location above the deck 12, the load 50 may be lowered to the deck 12 through the actuation of the winch 190 of crane system 100.

As the load 50 is transported through the air by crane system 100, load 50 is subject to undesirable motions linearly along and/or rotationally about horizontally extending axes 173 and 175 (axis 175 extending out of the page in FIG. 1) and the vertical axis 171 described above. For example, motion of the drilling vessel 10 in response to wave action of the body of water in which vessel 10 is positioned may induce motion of load 50 along or about axes 171, 173, and/or 175 as the load 50 is suspended by hook 170 vertically above the deck 12 of drilling vessel 10. Motion of load 50 along or about axes 171, 173, and 175 may present a hazard to personnel located on the deck 12 of drilling vessel 10 as well as to other equipment or structures located on the deck 12 such as mast 20. Thus, it is desirable to minimize such uncontrolled motion of the load 50 as the load 50 is transported through the air by crane system 100.

In this exemplary embodiment, the motion stabilizer 200 of crane system 100 is coupled between the distal end 153 of jib 150 and the hook 170 and is generally configured to counteract inadvertent motion of the load 50 along or about axes 171, 173, and 175 so as to stabilize the load 50 as it is transported through the air by the crane system 100. In this manner, inadvertent motion of the hook 170 and the load 50 suspended therefrom induced by the motion of drilling vessel 10 may be minimized so as to maximize the safety of crane system 100. Additionally, by minimizing inadvertent motion of load 50, motion stabilizer 200 may eliminate the requirement of attaching a stabilizing tug line to the load 50, further enhancing the safety of crane system 100 by minimizing the number of people within the vicinity of load 50 as it is transported by crane system 100.

Crane system 100 additionally includes a control system or controller 195 (shown schematically in FIG. 1) for controlling various aspects of the operation of crane system 100. Controller 195 generally includes one or more memory devices 196 and one or more processors 197 for executing instructions stored in the one or more memory devices 196. Controller 195 may also be equipped with one or more input/output (I/O) devices to permit operators of crane system 100 to provide input to the controller 195. Controller 195 may also include one or more wired or wireless communications devices for communicating between various components (e.g., sensors, servos, electronically controllable hydraulic power units (HPUs)) of crane system 100 in signal communication with controller 195, and/or for communicating with equipment located offboard the drilling vessel 10. In this exemplary embodiment, controller 195 is located onboard the drilling vessel 10; however, in other embodiments, at least a portion of controller 195 may be located offboard at a distance from the other components of crane system 100 including motion stabilizer 200.

Controller 195 may control the operation (e.g., in response to control inputs from an operator of crane system 100) of rotary couplings 104 and actuators 132 and 152 of control system 100. In some embodiments, controller 195 may control the operation of the motion stabilizer 200 of crane system 100 to stabilize the motion of the load 50 (or any other load) suspended from the hook 170 of crane system 100. The control of motion stabilizer 200 provided by controller 195 may be automatic and executed by an onboard closed loop control algorithm which receives control inputs from one or more sensors of the crane system 100, as will be discussed further herein. In this manner, controller 195 may automatically stabilize the motion of a load (e.g., load 50) suspended from the hook 170 of crane system 100 and thereby minimize inadvertent motion of the load as it is transported through the air by the crane system 100.

Referring now to FIGS. 2-8, additional views of the motion stabilizer 200 of crane system 100 are provided. In this exemplary embodiment, motion stabilizer 200 generally includes an upper or proximal mount 202, a central cable housing 230, and a lower or distal hook housing 260. As will be described further herein, motion stabilizer 200 provides for the automated and controlled displacement of the hook 170 of crane system 100 in each of the X, Y, and Z directions relative to the distal end 153 of jib 150 so as to counteract inadvertent motion of crane system 100 (e.g., due to inadvertent motion of drilling vessel 10) and thereby stabilize the hook 170.

In this exemplary embodiment, proximal mount 202 of motion stabilizer 200 extends laterally relative to a longitudinal axis of the motion stabilizer 200 and includes one or more upper or proximal control arms 204 pivotably coupled at upper or proximal pivot joints 206 to the distal end 153 of the jib 150 of crane system 100. Additionally, motion stabilizer 200 includes one or more upper or proximal linear actuators 220 coupled between the distal end 153 of jib 150 and the pair of proximal control arms 204 of proximal mount 202. In this configuration, extension of the proximal linear actuators 220 rotates the proximal mount 202 (as well as the cable housing 230 and hook housing 260) of motion stabilizer 200 in a first rotational direction about a first horizontal axis 215 which extends centrally through the pair of proximal pivot joints 204. Conversely, retraction of the proximal linear actuators 220 rotates the proximal mount 202 of motion stabilizer 200 in a second rotational direction about the first horizontal axis 215 that is opposite the first rotational direction. Thus, extension and retraction of proximal linear actuators 220 may result in the rotation of hook 170, which may be received in the hook housing 260 of motion stabilizer 200, in either rotational direction about the first horizontal axis 215.

Proximal mount 202 additionally includes in this exemplary embodiment a central opening or passage 210 through which the cable 180 of crane system 100 extends, and a pair of upper or proximal sheaves 212 located at a lower or distal end of the proximal mount 202 and which rollably engage and thereby center the cable 180 as the cable 180 extends through passage 210 and towards the cable housing 230 of motion stabilizer 200. Passage 210 and proximal sheaves 212 thereby permit the passage of hoisting cable 180 into cable housing 230.

The cable housing 230 of motion stabilizer 200 is positioned between the proximal mount 202 and hook housing 260 thereof and extends longitudinally between a first or proximal end coupled to the distal end of proximal mount 202, and a second or distal end coupled to the hook housing 260 of motion stabilizer 200. Additionally, in this exemplary embodiment, cable housing 230 is generally tubular in shape and defines a central passage 232 through which the hoisting cable 180 of crane system 100 extends. Further, in this exemplary embodiment, cable housing 230 comprises a first or outer cylinder 234 and a second or inner cylinder 236 telescopically received in the outer cylinder 234, where the inner cylinder 234 defines the central passage 232 of cable housing 230. It may be understood that hoisting cable 180 may, through the action of winch 190, be extended and retracted through the central passage 232 of cable housing 230 to thereby extend and retract the hook 170 from the hook housing 260, as will be discussed further herein.

Motion stabilizer 200 includes one or more intermediate linear actuators 240 coupled between the outer cylinder 234 of cable housing 230 and the proximal mount 202 whereby the intermediate linear actuators 240 flank the centrally extending cable housing 230 of motion stabilizer 200. In this configuration, extension of the intermediate linear actuators 240 rotates the cable housing 230 (as well as the hook housing 260 coupled therewith) in a first rotational direction about a second horizontal axis 235 which extends centrally through a pivot joint 233 located at the proximal end of cable housing 230. Conversely, retraction of the intermediate linear actuators 240 rotates the cable housing 230 in a second rotational direction about the second horizontal axis 235 that is opposite the first rotational direction. The second horizontal axis 235 extends orthogonally to the first horizontal axis 215 with the first horizontal axis 215 extending parallel to the "Y" direction shown in FIG. 2 and the second horizontal axis 235 extending parallel to the "X" direction shown in FIG. 2.

Motion stabilizer 200 additionally includes in this exemplary embodiment a lower or distal linear actuator 250 coupled between the outer cylinder 234 of cable housing and the inner cylinder 236 of cable housing 230. Distal linear actuator 250 may also be referred to herein as telescoping linear actuator 250. Extension of the telescoping linear actuator 250 along a vertical axis 255 (extending orthogonal to both the first and second horizontal axes 215 and 235) results in the extension of a lower or distal end 237 of the inner cylinder 236 from a lower or distal end 235 of the outer cylinder 234. Conversely, retraction of the telescoping linear actuator 250 along vertical axis 255 results in the retraction of the distal end 237 of inner cylinder 236 towards the distal end 235 of outer cylinder 234. In this manner, the hook housing 260, which is coupled to the distal end 237 of inner cylinder 236, may be displaced vertically upwards and downwards along the vertical axis 255 relative to the outer cylinder 234 of cable housing 230 and the proximal mount 202 of motion stabilizer 200 coupled thereto. In some embodiments, motion stabilizer 200 comprises a position sensor that monitors the linear position of telescoping linear actuator 250 and/or the degree of extension of inner cylinder 236 from the outer cylinder 234.

As described above, the hook housing 260 of motion stabilizer 200 may be rotated (in either rotational direction) about the first horizontal axis 215 relative to the jib 150 of crane system 100 in response to the actuation of proximal linear actuators 220. Additionally, hook housing 260 may be rotated (in either rotational direction) about the second horizontal axis 235 relative to the jib 150 of crane system 100 in response to the actuation of intermediate linear actuators 240. Further, hook housing 260 may be displaced linearly (in either longitudinal direction) along vertical axis 255 in response to the actuation of telescoping linear actuator 250. Linear actuators 220, 240, and 250 may be hydraulically, pneumatically, electrically or otherwise powered to selectably extend and retract.

Figure 5:
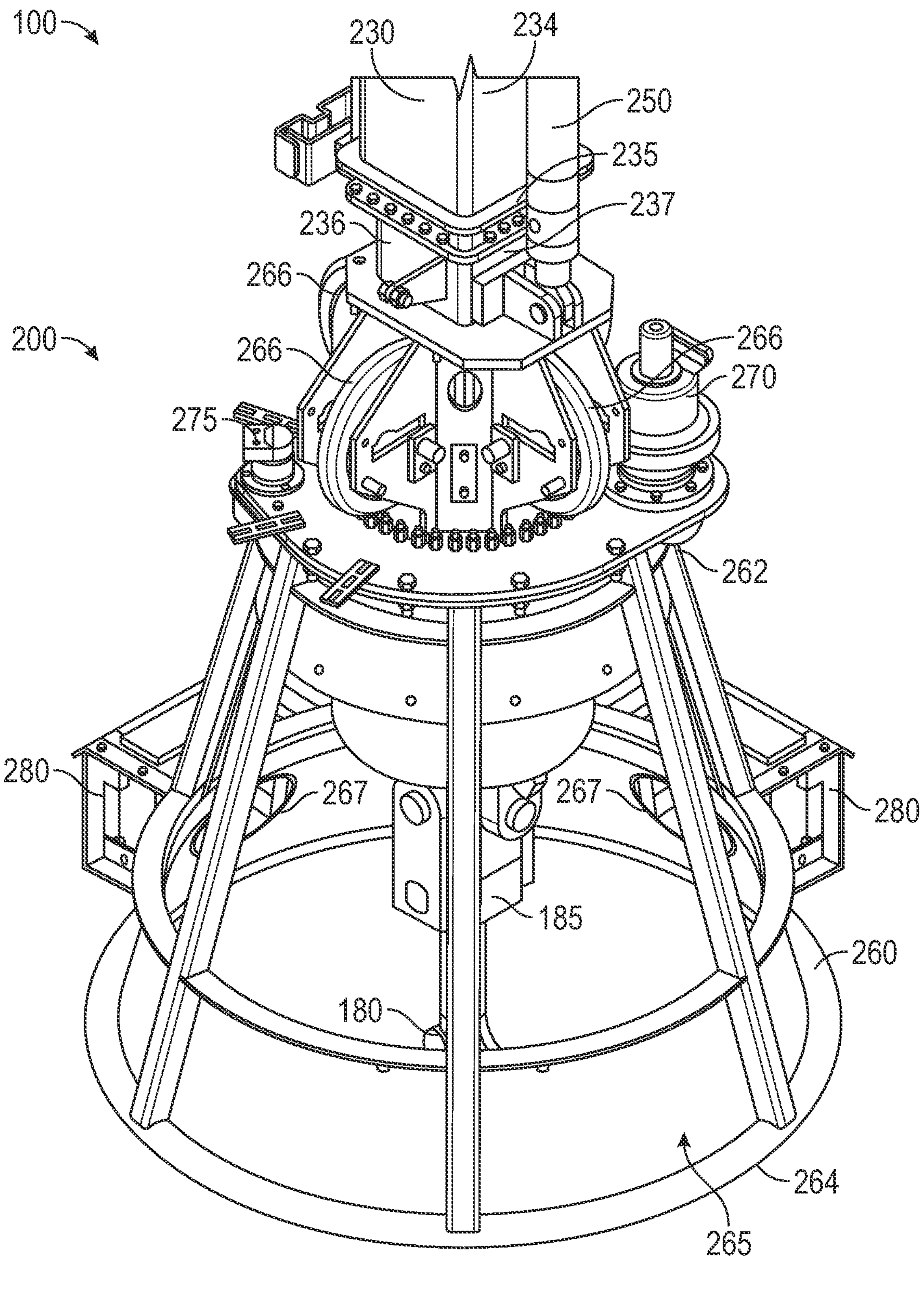
FIG. 5 is a perspective view of an embodiment of a hook housing of the motion stabilizer of FIG. 2.
Figure 7:
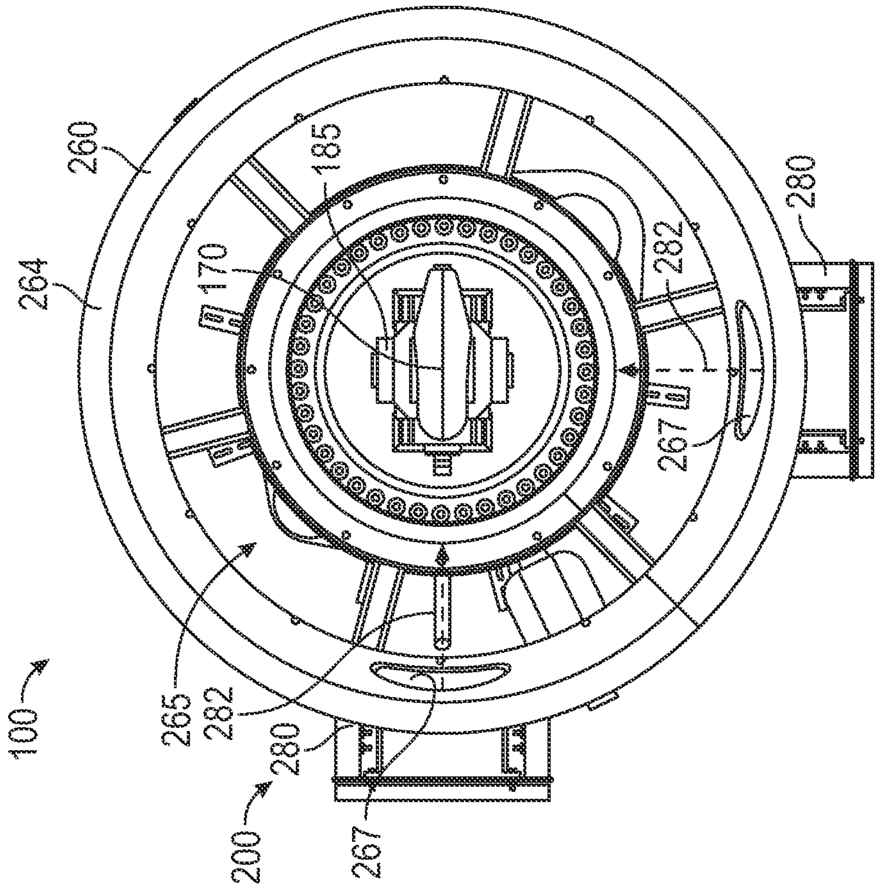
FIG. 7 is a bottom view of the motion stabilizer of FIG. 2.
Figure 6:
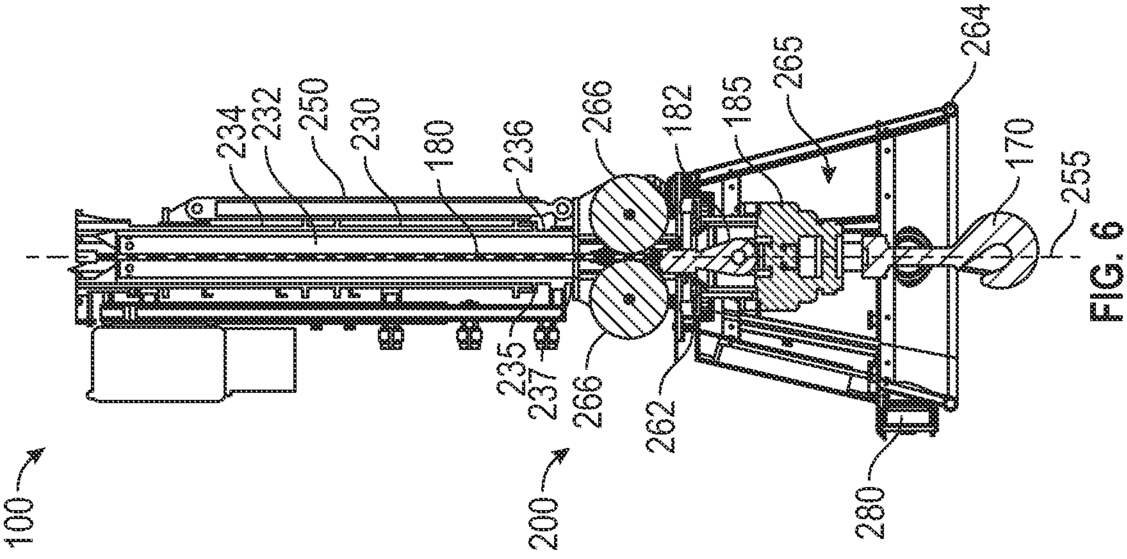
FIG. 6 is a side cross-sectional view of the motion stabilizer of FIG. 2.

As shown particularly in FIGS. 5-7, hook housing 260 of motion stabilizer 200 is bell-shaped in this exemplary embodiment and extends between an upper or proximal end 262 and a lower or distal end 264. The proximal end 262 of hook housing 260 couples to the distal end 237 of the inner cylinder 236 of cable housing 230 through a rotary actuator or "slew" 270 of motion stabilizer 200 coupled between the cable housing 230 and hook housing 260. Rotary actuator 270 is configured to selectably rotate, in either rotational direction, the hook housing 260 about vertical axis 255 relative to the cable housing 230. Additionally, in this exemplary embodiment, motion stabilizer 200 comprises an angular position sensor 275 coupled to the hook housing 260 and configured to determine or monitor the angular position of hook housing 260 about the vertical axis 255 relative to the cable housing 230. Further, in this exemplary embodiment, motion stabilizer 200 comprises a plurality of lower or distal sheaves 266 positioned between cable housing 230. Distal sheaves 266 engage the hoisting cable 180 of crane system 100 to guide and centralize a terminal end 182 of hoisting cable 180 receivable in hook housing 260.

In this exemplary embodiment, motion stabilizer 200 comprises a pair of optical sensors 280 coupled to the hook housing 260 proximal the distal end 264 thereof. Particularly, a pair of openings 267 are formed in the hook housing 260 proximal the distal end 264 thereof and which are spaced approximately ninety degrees apart about vertical axis 255. Optical sensors 280 are coupled or mounted to an exterior of the hook housing 260 and are oriented such that a sensor axis 282 of each optical sensor 280 extends radially into an interior 265 of the hook housing 260 and towards the hook 170 (when positioned within interior 265) and hoisting cable 180 as shown particularly in FIG. 7.

In this exemplary embodiment, optical sensors 280 comprise high resolution depth cameras and thus may also be referred to herein as depth cameras 280. As used herein, the term "optical" refers to electromagnetic radiation that is within or outside of the visible spectrum. For each depth camera 280, each pixel within the field of view (FOV) of the depth camera 280 is assigned a depth parameter in addition to the conventional red, green, and blue (RGB) parameters. Each depth camera 280 may include a pair of lenses spaced apart from each other to permit the depth camera 280 to sense or detect the depth of objects within the field of view of the depth camera 280. In this manner, the depth or distance of objects falling within the FOV of each depth camera 280 may be determined and monitored by depth camera 280, including the hook 170 and/or hoisting cable 180. Additionally, by positioning depth cameras 90 at approximately ninety degrees apart from each other, the position of hook 170 and/or hoisting cable 180 within the interior 265 of hook housing 260 may be monitored by the depth cameras 280. While in this exemplary embodiment optical sensors 280 comprise depth cameras, it may be understood that in other embodiments optical sensors 280 may comprise other types of sensors which may be utilized to tracking the position of the hook 170 and/or hoisting cable

180 within the interior 265 of hook housing 260. For example, in other embodiments, optical sensors 280 may comprise laser sensors such as laser scanning sensors (e.g., Lidar sensors) which utilize infrared beams projected from the laser sensors for determining the position of objects of interest such as the hook 170 and/or hoisting cable 180. In still other embodiments, optical sensors 280 may comprise sensors other than optical sensors such as, for example, radar sensors, etc.

In some embodiments, crane system 100 may include additional sensors that may provide a control input to the controller 195 for controlling the operation of motion stabilizer 200. For example, crane system 100 may comprise one or more inertial measurement units (IMUs) 198 and 199 (shown schematically in FIG. 1. For example, a first or stabilizer IMU 198 is mounted to the motion stabilizer 200 (e.g., to the hook housing 260) in this exemplary embodiment for determining the gravity vector and/or for monitoring linear accelerations of the motion stabilizer 200 in the "X" and "Y" directions. A second or crane IMU 199 is mounted onto the jib 150 for monitoring accelerations of the jib 150 in the "X" and "Y" directions due to the movement of the drilling vessel 10 or of the crane system 100.

Figure 8:
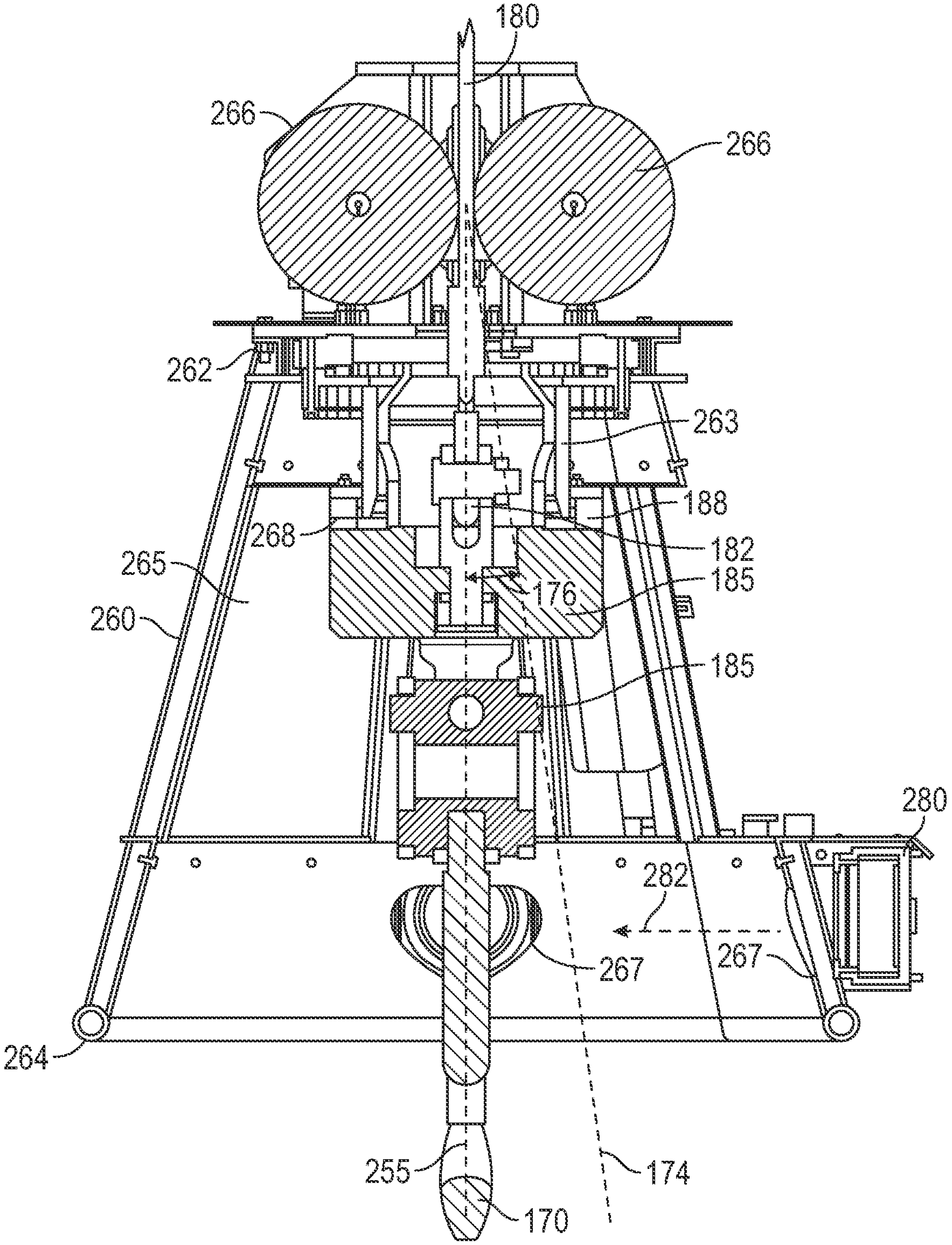
FIG. 8 is a side cross-sectional view of the hook housing of FIG. 5.

Referring now to FIG. 8, an additional view of the hook 170, hoisting cable 180, and hook housing 260 is provided. In this exemplary embodiment, hook housing 260 comprises an internal receptacle or dock 263 centrally positioned within the interior 265 of hook housing 260 near the proximal end 262 thereof. Additionally, the terminal end 182 of hoisting cable 180 is coupled to a pivotable connector or joint 185 (partially hidden from view in FIG. 8) that permits hook 170 to pivot relative to the terminal end 182 of hoisting cable 180. In this exemplary embodiment, pivotable connector 185 comprises a universal joint; however, it may be understood that in other embodiments the configuration of pivotable connector 185 may vary. Further, in this exemplary embodiment, dock 263 of hook housing 260 defines a first plurality of circumferentially spaced engagement members or castellations 268 while pivotable connector 185 defines a second plurality of circumferentially spaced engagement or castellations 188 which may interlock with the first plurality of castellations 268 to restrict relative rotation between hook 170 and the hook housing 260 about the vertical axis 255 when hook 170 is in a fully retracted or docked position as shown in FIG. 8. By limiting relative rotation between the hook 170 and hook housing 260, the angular orientation of the hook 170 (and a load suspended therefrom) may be controlled the rotary actuator 270 of motion stabilizer 200.

As described above, motion stabilizer 200 of crane system 100 may be utilized to automatically stabilize the motion of hook 170 and any load suspended therefrom. As an example, FIG. 8 illustrates hook 170 in the docked position and in a vertical orientation aligned with vertical axis 255 with hook 170 extending centrally through the hook housing 260 of motion stabilizer 200. However, as the crane system 100 is operated to transport a load suspended from hook 170, the hook 170 may move or sway inadvertently in hook housing 260, resulting in inadvertent motion of the load suspended therefrom. Particularly, the segment of hoisting cable 180 located between the distal sheaves 266 is constrained to a central position aligned with vertical axis 255 while the hook 170 coupled to the terminal end 182 of hoisting cable 180 is free to sway as a pendulum from the segment of cable 180 constrained by distal sheaves 266, where the pendulum length corresponds to the length extending from the constrained segment of hoisting cable 180 to the hook 170. As such, the hook 170 may sway into misalignment with vertical orientation 171 such that hook 170 occupies an angled or inclined orientation (indicated schematically in FIG. 8 by dashed line 174) that is at a non-zero hook or cable angle 176 (referred to herein simply as hook/cable angle 176) relative to the vertical axis 255. Hook/cable angle 176 may be related to the vertical axis 255 (extending vertically and thus aligned with the gravity vector) by data collected by one or more IMUs mounted to the crane system 100. Hook/cable angle 176 may vary in both magnitude and angular direction about the vertical axis 255.

In this exemplary embodiment, controller 195 is in signal communication with IMUs 198 and 199, angular position sensor 275, and the optical sensors 280. As described above, optical sensors 280 monitor in real-time the position of hook 170 (when in the docked position) and of hoisting cable 180 (when hook 170 is not in the docked position) including the magnitude and angular direction of the hook 170 and hoisting cable 180. The position of hook 170 and hoisting cable 180 in terms of the magnitude and angular direction of hook/cable angle 176 may be provided by optical sensors 280 of motion stabilizer 200 to the controller 195 of crane system 100 as a control input to the controller 195. In this manner the hook/cable angle 176 and the angular speed of the hook 170/cable 180 may be monitored and controlled by the controller 195 which may have advantages in some applications in terms of the smoothness of the operation of controller 195 compared to monitoring the linear position of the hook 170/cable 180.

Figure 9:
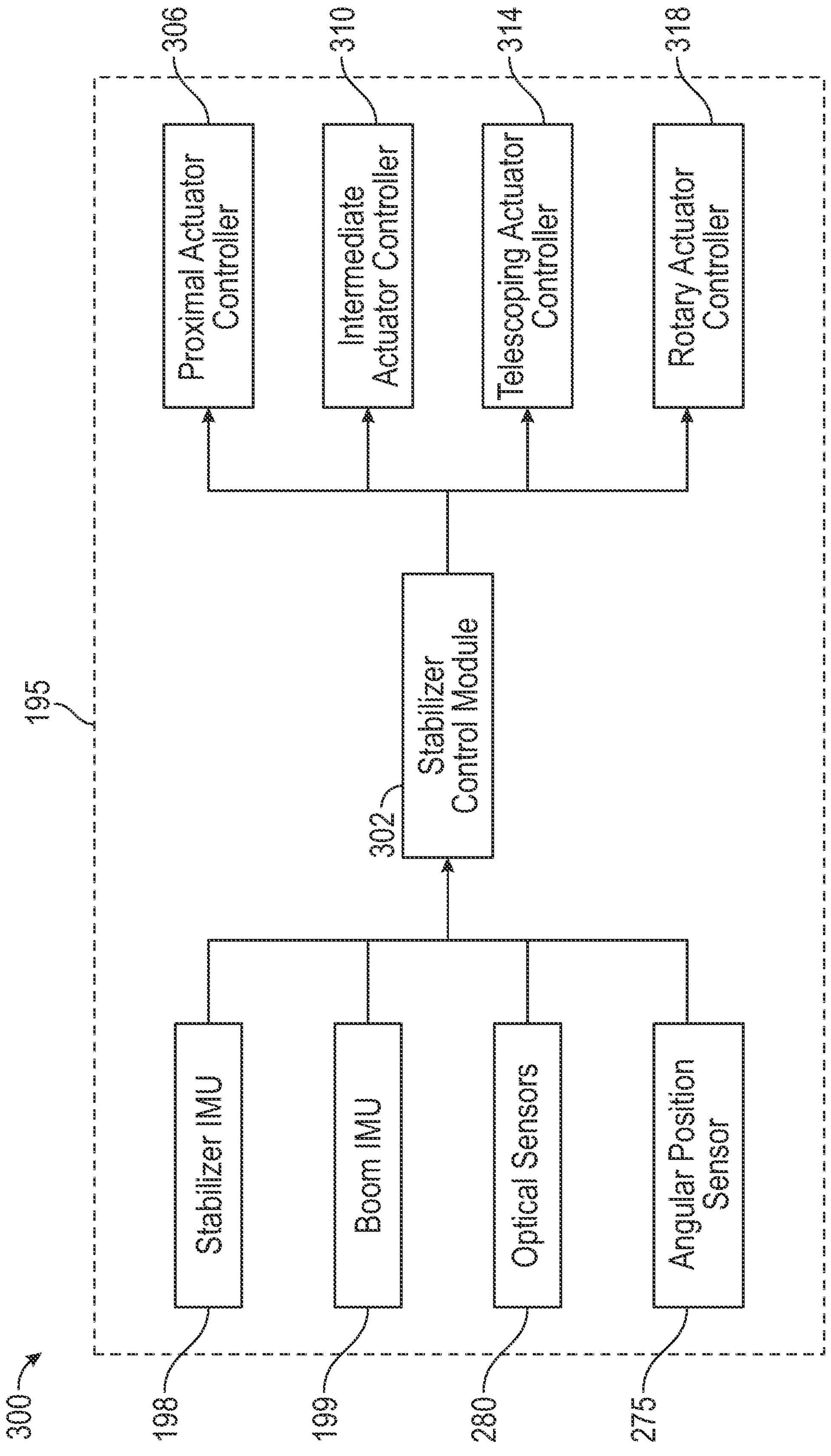
FIG. 9 is a block diagram of a control schema of the crane system of FIG. 1 according to some embodiments.

Referring now to FIG. 9, a block diagram is shown illustrating an exemplary control logic or schema 300 which may be implemented using controller 195 and other hardware of the crane system 100. In this exemplary embodiment, control schema 300 generally includes IMUs 198 and 199, angular position sensor 275, optical sensors 280, a stabilizer control module 302, a proximal actuator controller 306, an intermediate actuator controller 310, a telescoping actuator controller 314, and a rotary actuator controller 318. IMUs 198, 199, angular position sensor 275, and optical sensors 280 are each in signal communication with the stabilizer control module 302 and provide module 302 with a distinct sensor output.

Stabilizer control module 302 of control schema 300 may comprise software stored in the one or more memory devices 196 of controller 195 and which may be executed by the one or more processors 197 thereof. In this exemplary embodiment, stabilizer control module 302 is configured to provide a control input, based on one or more of the sensor outputs received by module 302 from IMUs 198 and 199, angular position sensor 275, and optical sensors 280, to the actuator controllers 306, 310, 314, and 318 of control schema 300. Actuator controllers 306, 310, 314, and 318 are each in signal communication with stabilizer control module 302. Particularly, proximal actuator controller 306 is configured to control the operation of proximal linear actuators 220. Similarly, intermediate actuator controller 310 is configured to control the operation of intermediate linear actuators 240. Additionally, telescoping actuator controller 314 is configured to control the operation of telescoping linear actuator 250. Further, rotary actuator controller 318 is configured to control the operation of rotary actuator 270. Actuator controllers 306, 310, 314, and 318 may take the form of servos, solenoid valves, or other equipment which allows for the electronic control of the corresponding actuators of crane system 100 operated by actuator controllers 306, 310, 314, and 318.

Stabilizer control module 302 may compute a first control input for controlling proximal linear actuators 220 and a second control input for controlling intermediate linear actuators 240 to maintain the hook 170 and cable 180 in the vertical orientation based on feedback provided by the optical sensors 280 of motion stabilizer 200 which may, as described above, monitor the position of hook 170 or cable 180 within the interior 265 of hook housing 260. As an example, stabilizer control module 302 may compute an angular position (hook/cable angle 176) and angular velocity of the hook 170 or cable 180 based on the feedback provided by the optical sensors 280 and generate control inputs for linear actuators 220 and 240 based on the computed angular position and/or angular velocity of the hook 170 or cable 180 to counteract inadvertent motion of the hook 170 or cable 180 that departs from the vertical orientation 17 thereof. Thus, based on feedback provided by optical sensors 280, the control inputs for both the proximal linear actuators 220 and intermediate linear actuators 240 may be continuously computed in real-time by stabilizer control module 302 to minimize the hook/cable angle 176 and thereby maintain the hook 170/cable 180 in the vertical orientation 171.

The stabilizer control module 302 of crane system 100, including automatically controlling the operation of linear actuators 220 and 240 as described above, may also automatically control the operation of telescoping linear actuator 250. Particularly, in some embodiments, stabilizer control module 302 automatically controls the operation of telescoping linear actuator 250 to maintain a desired amount of tension in the hoisting cable 180 such that 185 maintains in contact with the dock 263 of hook housing 260 when hook 170 is in the docked position, restricting relative rotation between hook 170 and dock 263.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A motion-stabilized crane system for lifting a load, the crane system comprising:

- a crane base extending from a first end to a second end opposite the first end;
- a crane boom having a first end pivotably coupled to the second end of the crane base and a second end opposite the first end;
- a hoisting cable supported by the crane boom;
- a hook suspended from the hoisting cable of the crane system;
- a motion stabilizer pivotably coupled to the second end of the crane boom, the motion stabilizer comprising:
  - a hook housing in which at least one of the hoisting cable and the hook is received;
  - a linear actuator coupled to the hook housing and configured to rotate the hook housing about a first axis in response to the activation of the linear actuator;
  - a sensor coupled to the hook housing and configured to capture as a sensor output associated with the position of at least one of the hook and the hoisting cable in the hook housing; and
  - a stabilizer control module configured to activate the linear actuator to reduce an angle formed between at least one of the hook and the hoisting cable and a vertical axis based on the senor output produced by the sensor.

2. The crane system of claim 1, wherein:

- the linear actuator comprises a first linear actuator and the motion stabilizer further comprises a second linear actuator coupled to the hook housing and configured to rotate the hook housing about a second axis, extending orthogonal to the first axis, in response to the activation of the second linear actuator; and
- the stabilizer control module is configured to activate the first linear actuator and the second linear actuator to reduce the angle formed between at least one of the hook and the hoisting cable and the vertical axis based on the senor output produced by the sensor.

3. The crane system of claim 2, wherein the first axis is a first horizontal axis and the second axis is a second horizontal axis each oriented orthogonal the vertical axis.

4. The crane system of claim 1, wherein the motion stabilizer further comprises a stabilizer inertial measurement unit (IMU) coupled to the hook housing, and wherein the stabilizer control module is configured to determine the angle formed between the at least one of the hook and the hoisting cable and the vertical axis based on an output produced by the stabilizer IMU.

5. The crane system of claim 1, wherein the sensor comprises a first optical sensor and the motion stabilizer further comprises a second optical sensor coupled to the hook housing and oriented ninety degrees from the first optical sensor.

6. The crane system of claim 5, wherein both the first optical sensor comprises a first depth camera and the second optical sensor comprises a second depth camera.

7. The crane system of claim 1, wherein the hook housing comprises an internal dock that couples to the hook when the hook is in a docked position to restrict relative rotation between the hook and the hook housing.

8. The crane system of claim 1, wherein:

- the motion stabilizer further comprises a telescoping actuator coupled to the hook housing and configured to displace the hook housing along the vertical axis in response to the activation of the telescoping actuator; and
- the stabilizer control module is configured to activate the telescoping actuator to maintain a tension on a terminal end of the hoisting cable.

9. The crane system of claim 1, wherein the hook housing of the motion stabilizer comprises a plurality of circumferentially spaces sheaves which engage the hoisting cable to align a segment of the hoisting cable positioned between the plurality of sheaves with the vertical axis.

10. A motion-stabilized crane system for lifting a load, the crane system comprising:

- a crane base extending from a first end to a second end opposite the first end;

a crane boom having a first end pivotably coupled to the second end of the crane base and a second end opposite the first end;

a hoisting cable supported by the crane boom;

a hook suspended from the hoisting cable of the crane system;

a motion stabilizer pivotably coupled to the second end of the crane boom, the motion stabilizer comprising:

a hook housing in which at least one of the hoisting cable and the hook is received;

a linear actuator coupled to the hook housing and configured to rotate the hook housing about a first axis in response to the activation of the linear actuator;

an optical sensor coupled to the hook housing and configured to capture as a sensor output associated with the position of at least one of the hook and the hoisting cable in the hook housing; and a stabilizer control module configured to activate the linear actuator to counteract an uncontrolled motion of at least one of the hook and the hoisting cable based on the senor output produced by the optical sensor.

11. The crane system of claim 10, wherein the uncontrolled motion of the at least one of the hook and the hoisting cable forms an angle between the at least one of the hook and the hoisting cable and a vertical axis, and wherein the stabilizer control module is configured to activate the linear actuator to reduce the angle formed between the at least one of the hook and the hoisting cable and the vertical axis based on the senor output produced by the optical sensor.

12. The crane system of claim 10, wherein:

the linear actuator comprises a first linear actuator and the motion stabilizer further comprises a second linear actuator coupled to the hook housing and configured to rotate the hook housing about a second axis, extending orthogonal to the first axis, in response to the activation of the second linear actuator; and the stabilizer control module is configured to activate the first linear actuator and the second linear actuator to counteract the uncontrolled motion of the at least one of the hook and the hoisting cable based on the senor output produced by the optical sensor.

13. The crane system of claim 10, wherein the optical sensor comprises a first optical sensor and the motion stabilizer further comprises a second optical sensor coupled to the hook housing and oriented ninety degrees from the first optical sensor.

14. The crane system of claim 13, wherein both the first optical sensor comprises a first depth camera and the second optical sensor comprises a second depth camera.

15. The crane system of claim 10, wherein the hook housing comprises an internal dock that couples to the hook when the hook is in a docked position to restrict relative rotation between the hook and the hook housing.

16. The crane system of claim 10, wherein:

the motion stabilizer further comprises a telescoping actuator coupled to the hook housing and configured to displace the hook housing along a vertical axis in response to the activation of the telescoping actuator; and the stabilizer control module is configured to activate the telescoping actuator to maintain a tension on a terminal end of the hoisting cable.

17. A motion stabilizer for a crane system, the motion stabilizer comprising:

a hook housing configured to receive at least one of a hoisting cable and a hook of the crane system;

a linear actuator coupled to the hook housing and configured to rotate the hook housing about a first axis in response to the activation of the linear actuator;

a sensor coupled to the hook housing and configured to capture as a sensor output associated with the position of at least one of the hook and the hoisting cable of the crane system in the hook housing when the motion stabilizer is coupled to a crane boom of the crane system; and a stabilizer control module configured to activate the linear actuator to reduce an angle formed between at least one of the hook and the hoisting cable and a vertical axis based on the senor output produced by the sensor.

18. The motion stabilizer of claim 17, wherein:

the linear actuator comprises a first linear actuator and the motion stabilizer further comprises a second linear actuator coupled to the hook housing and configured to rotate the hook housing about a second axis, extending orthogonal to the first axis, in response to the activation of the second linear actuator; and the stabilizer control module is configured to activate the first linear actuator and the second linear actuator to reduce the angle formed between at least one of the hook and the hoisting cable and the vertical axis based on the senor output produced by the sensor.

19. The motion stabilizer of claim 17, wherein the sensor comprises a first optical sensor and the motion stabilizer further comprises a second optical sensor coupled to the hook housing and oriented ninety degrees from the first optical sensor.

20. The motion stabilizer of claim 19, wherein both the first optical sensor comprises a first depth camera and the second optical sensor comprises a second depth camera.

* * * * *